United States Patent [19]
Frey et al.

[11] 3,729,254

[45] Apr. 24, 1973

[54] SLIDE PROJECTOR FOR UNSUPPORTED FLEXIBLE SLIDE HOLDERS

[75] Inventors: Gerald J. Frey, Santa Barbara, Gary E. Peterson, Sun Valley, both of Calif.

[73] Assignee: said Frey by said Peterson

[22] Filed: Nov. 19, 1971

[21] Appl. No.: 200,468

[52] U.S. Cl. ................................................353/109
[51] Int. Cl. ..............................................G03b 23/08
[58] Field of Search ....................353/109; 40/32, 96, 40/97, 98, 35

[56] References Cited

UNITED STATES PATENTS

| | | | |
|---|---|---|---|
| 3,170,369 | 2/1965 | Frey | 40/98 |
| 172,328 | 1/1876 | Lauer | 40/98 |
| 394,498 | 12/1888 | Miller | 40/98 |
| 1,856,234 | 5/1932 | Birdsall | 353/109 |

FOREIGN PATENTS OR APPLICATIONS

| | | | |
|---|---|---|---|
| 607,112 | 7/1960 | Italy | 353/109 |

*Primary Examiner*—Harry N. Haroian
*Assistant Examiner*—A. J. Mirabito
*Attorney*—Thomas M. Small

[57] ABSTRACT

A slide projector for slides mounted on a slide holder having a series of clips around an endless flexible belt which is inserted in the projector through an access opening in the top wall, fitted loosely around parallel rotary supporting elements permanently mounted in the recess to project toward the access opening, located at the proper level in the projector by positioning surfaces in the projector, and then tensioned by moving one of the supporting elements away from the other. The movable supporting element is positioned in one of the plurality of different zones, for slide holders of different capacities, and is spring-loaded in each zone to apply the proper tensioning force. Feeding of the slides is accomplished by reciprocating motor and a driver having a reversible ratchet coupling with one of the rotary elements which has teeth for engaging the overhanging end portions of alternate slips around the belt, and the driver also serves as the actuator for a positioning fork which locks the slide to be projected against one of the rotary elements. In a modified form, the driver also operates a hold-out apparatus engageable with the slides on opposite side of the one being projected and an oscillating shutter for blocking the light beam during slide changing.

43 Claims, 15 Drawing Figures

Patented April 24, 1973 3,729,254

Patented April 24, 1973 3,729,254

Patented April 24, 1973
3,729,254
4 Sheets-Sheet 3
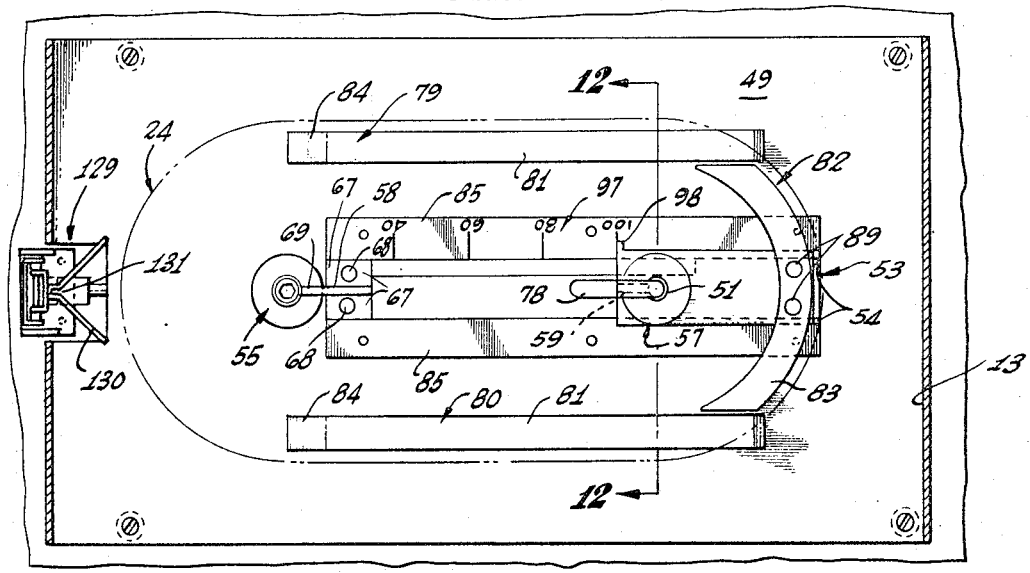
Fig. 10
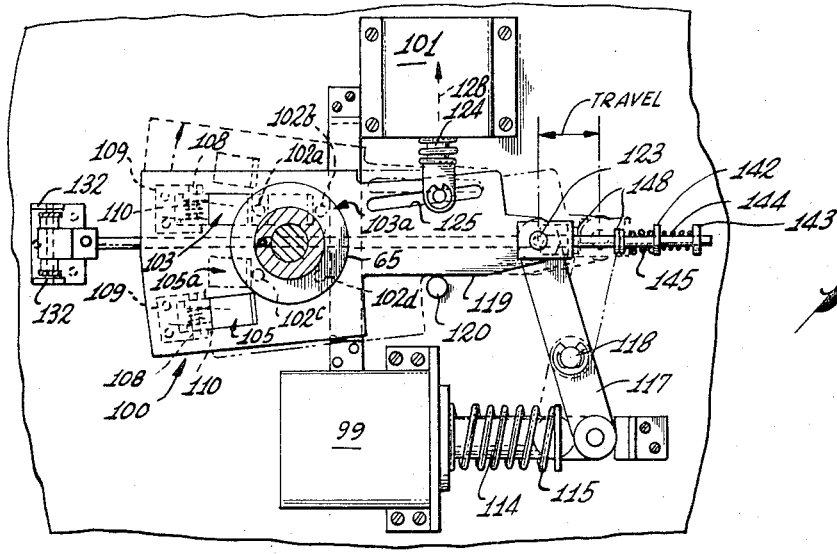
Fig. 11
Fig. 12

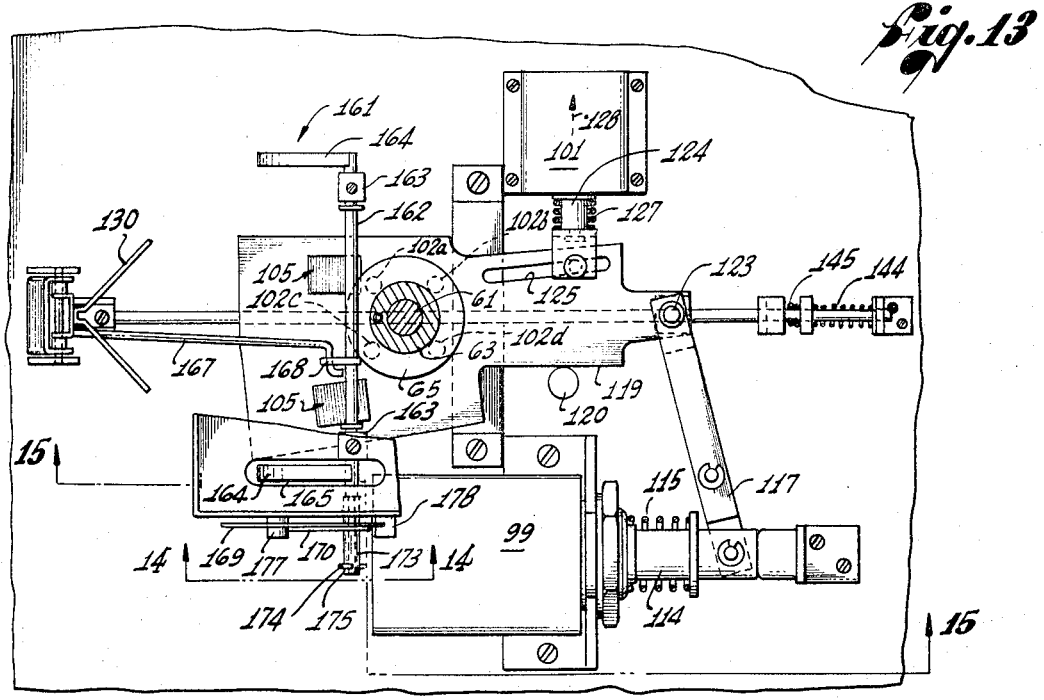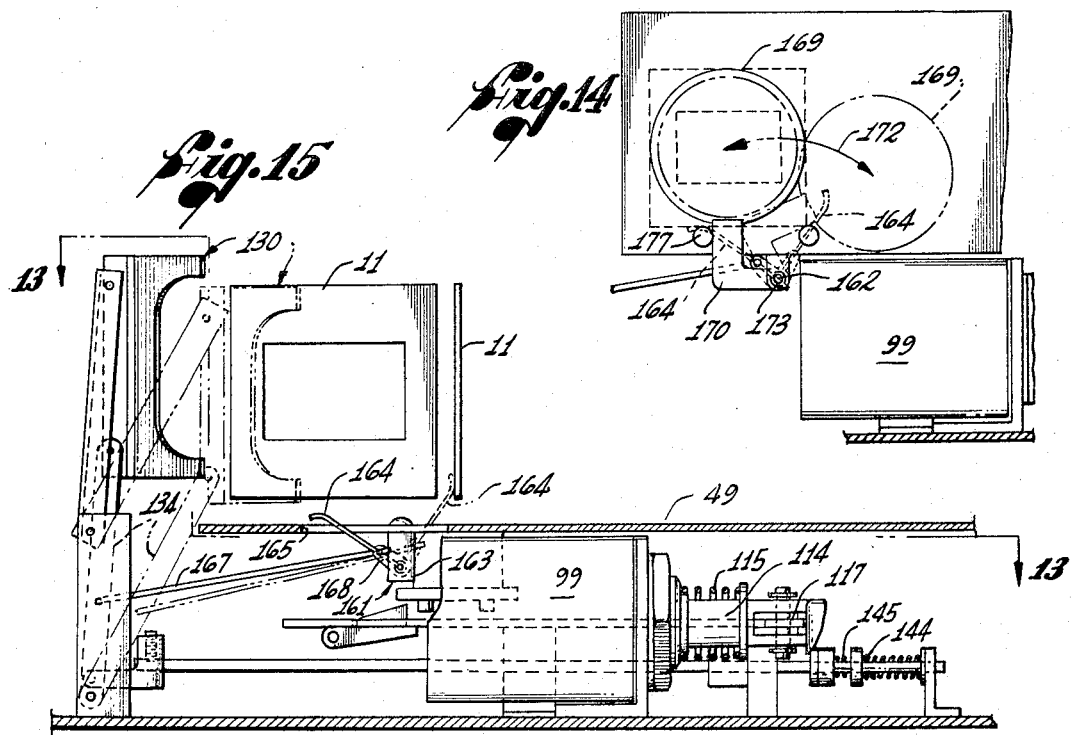

SLIDE PROJECTOR FOR UNSUPPORTED FLEXIBLE SLIDE HOLDERS

BACKGROUND OF THE INVENTION

This invention relates to slide projectors for optically projecting enlarged images from transparencies onto a screen or the like. The invention relates more specifically to a new and improved slide projector for use with an endless flexible slide holder having means thereon for gripping a series of slides and holding them in outwardly projecting, side-by-side relation for insertion in the projector and for step-by-step feeding through a film gate, herein called a projection position or station, in the projector.

An earlier slide projector of this general type is disclosed in U.S. Pat. No. 3,170,369, in which the slide holder is a box-like magazine having two parallel shafts therein supporting an endless flexible belt with a series of clips fastened to its outer side to receive and grip the edges of the slides to be projected. The magazine was designed to be fitted into a recess in the top of the projector, and was both positioned relative to the optical system of the projector and coupled to the drive mechanism of the projector as an incident to its insertion. The drive mechanism rotated one of the supporting shafts step by step in a selected direction to drive the belt around the shafts and bring successive slides into a projection position extending downwardly from the lower shaft of the magazine and across the axis of the optical system. To change from one group of slides to another, one magazine was removed and another was fitted into the projector in its place.

In general, such prior projectors were suitable for their intended purposes, and had several advantages over other types of projectors that have been available. The requirement of a magazine, however, created some problems, primarily from the standpoint of bulk, cost of manufacture, and difficulty in handling. Moreover, the rotary drive mechanisms used by such projectors were relatively slow and expensive.

SUMMARY OF THE INVENTION

The present invention resides in a new and improved slide projector which has the advantages of such prior projectors, and particularly the advantages resulting from the use of an endless flexible slide holder, while eliminating the need for a bulky and expensive magazine, cartridge, box or other supporting housing for the slide holder. The projector is adapted to receive an unsupported, endless flexible slide holder directly into the operative position in a quick and simple operation, to support and drive the slide holder smoothly and rapidly in a simple and effective manner, and to produce high quality projection of the slides. Moreover, changing of slides and the transition from one set of slides to another, even with slide holders of different sizes and capacities, are accomplished with a minimum of manipulation.

To the foregoing ends, two supporting elements for receiving the flexible slide holder are permanently mounted in the projector to project in parallel relation toward an access opening in one side of the projector, preferably the top, and are relatively movable toward and away from each other between a contracted condition in which the slide carrier may be fitted freely over the supporting elements, and an extended condition in which the carrier is properly tensioned around the elements. One of the supporting elements is a shaft disposed alongside the projection station of the projector, and is rotatable about a fixed axis, and the other preferably is a shaft or roller that is rotatable about a parallel axis and is mounted on a sliding mounting for movement back and forth, toward and away from the fixed shaft. Positioning surfaces are provided inside the projector to limit the insertion of the slide carrier and the slides thereon, and to hold them at the proper level for projection, and the mounting that carries the movable supporting element is adapted to be positioned selectively in a novel manner in one of a plurality of zones in which a preselected approximate spring tensioning force is applied to slide holders of different capacities to tension them properly around the supporting elements.

Another feature of the projector is a simplified and very effective drive mechanism which uses a single reciprocating motor and a ratchet drive device both to feed the slide holder step by step and to operate a slide-positioning fork in precisely timed relation with the movements of the slide holder, through a novel linkage. A second reciprocating motor shifts the drive mechanism selectively between forward and reverse modes of operation.

The supporting shaft positioned alongside the slide-projection station preferably is square in cross-section so that the slide to be projected is positioned against a flat side of the shaft and the two adjacent slides are held ninety degrees away from the slide being projected, as a result of engagement of the carrier with the adjacent flat sides of the shaft. To insure against sagging of these adjacent slides into the light path and to enhance the tensioning of the carrier about the square shaft, a novel hold-out apparatus is incorporated in and operated by the drive mechanism to engage both adjacent slides and press them positively away from the slide being projected. This same apparatus is advantageously used to operate a shutter for covering and uncovering the light path during slide changing, so as to avoid a possible objectionable light flash or streak.

More detailed features of the projector reside in a positive drive coupling between the flexible holder and the driving shaft for insuring against slippage of the holder in a simple and effective manner, in a very convenient scanning actuator that may be operated simply by depressing the readily accessible cover door of the projector, and in the various detailed aspects of the projector which cooperate to provide a new and significantly improved projector which is very convenient to operate, permits the use of inexpensive and compact slide holders, is effective for high quality projection during operation, and, at the same time, is capable of being mass-produced for sale at competitive prices.

Other objects and advantages of the invention will become apparent from the following detailed description, taken in conjunction with the accompanying drawings.

BRIEF DESCRIPTION OF THE DRAWINGS

FIG. 10 is a fragmentary view on a reduced scale, partly in cross-section and partly a plan view, taken substantially along line 10—10 of FIG. 6, with the slide holder removed from the projector;

FIG. 11 is a fragmentary view on a similarly reduced scale taken substantially along line 11—11 of FIG. 6;

FIG. 12 is a fragmentary cross-section taken along line 12—12 of FIG. 10;

FIG. 13 is a fragmentary plan view of parts of the drive mechanism and slide positioning apparatus of a modified form of the projector, the view being taken substantially along line 13—13 of FIG. 15;

FIG. 14 is a fragmentary view, partly in section, taken along line 14—14 of FIG. 13; and FIG. 15 is a fragmentary view, partly in section, taken substantially along line 15—15 of FIG. 13.

DETAILED DESCRIPTION

Figure 1:
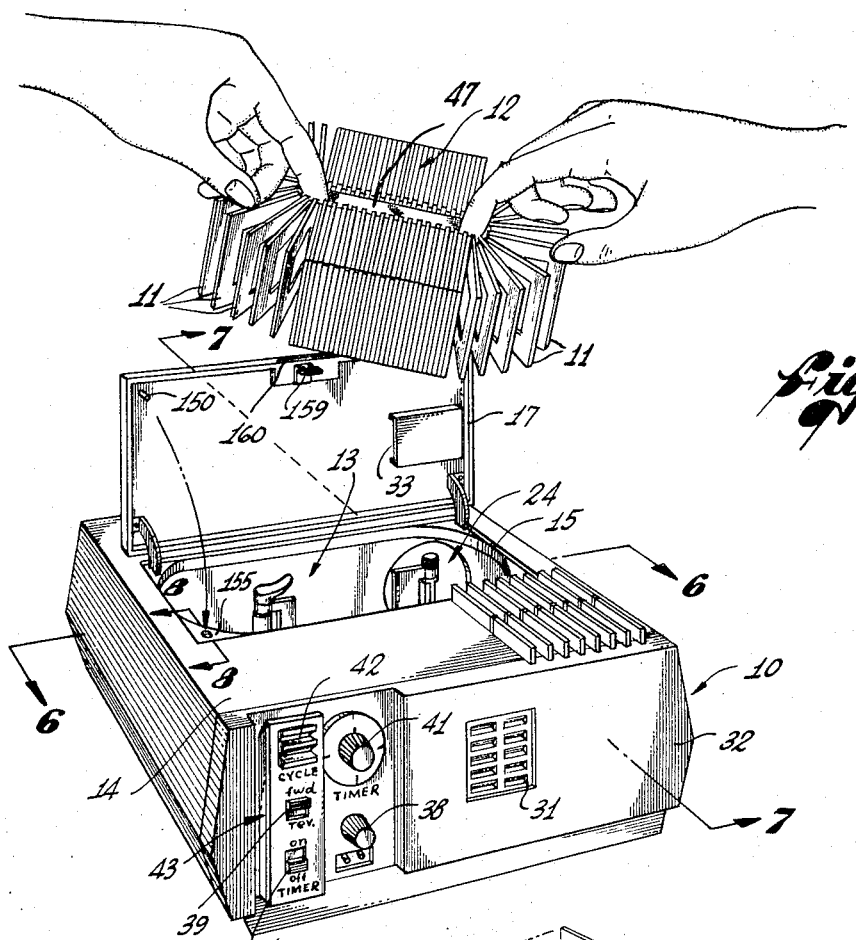
FIG. 1 is a perspective view of a slide projector embodying the novel features of the present invention, shown with the cover open and a slide holder loaded with slides positioned for insertion into the projector.

As shown in the drawings for purposes of illustration, the invention is embodied in a slide projector 10 for use in projecting images from conventional framed transparencies or slides 11, supported on a slide holder 12, onto a conventional viewing screen or the like (not shown). In general, the projector comprises a hollow case, shown most clearly in FIG. 1, having a slide-receiving recess 13 extending downwardly from its upper side 14 from an access opening 15 that is closed during normal operation by a hinged cover door 17. The projector has a basically conventional optical system comprising a lamp 18 (FIG. 7) mounted in one rear corner of the case, condensing lenses 19 and 20 in front of the lamp, and an objective lens 21 in a lens barrel 22 that is movably mounted in the front wall 23 of the case to project an image from a slide 11 positioned in a film gate 24 between the condensing and objective lenses, herein referred to as the projection station.

Figure 7:
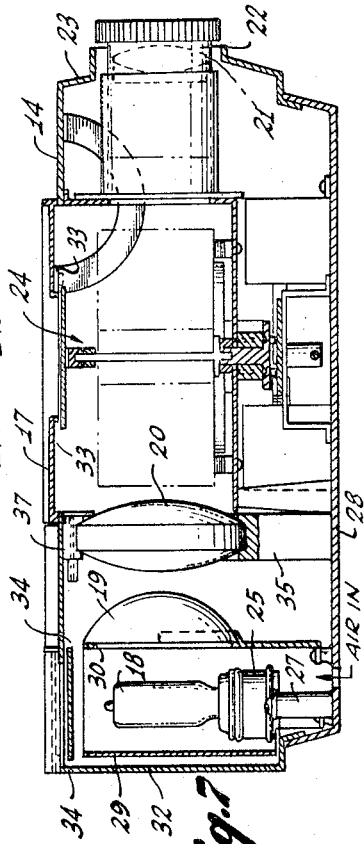
FIG. 7 is a longitudinal cross-section view taken along line 7—7 of FIG. 1, substantially along the optical axis, on a smaller scale than the scale of FIG. 6.

As shown in FIG. 7, the lamp 18 has a conventional bulb which is fitted into a socket 25 supported on posts 27 upstanding from the bottom wall 28 of the case, and is surrounded by a baffle 29 having an open upper end, an opening 30 in its front side over which the lens 19 is mounted, and air-flow slots in the bottom wall 28 for forced circulation of cooling air around the lamp. For this purpose, a blower (not shown) is provided in the case, in front of an exhaust vent 31 (FIG. 1) in the rear wall 32, and is arranged to exhaust air from the case while drawing outside air into the case through vents 33 in the top wall above the projection station 24, thereby cooling slides during projection, as well as through the slots in the bottom wall and vents 34 above the lamp. The lens 20 is supported in front of the baffle on a standard 35, and is secured to the top wall by a fitting 37 thereon.

With a series of slides 11 in the projector 10 on a slide holder 12, successive slides are moved one by one into the projection station 24 so that the beam of light from the lamp 18 is directed by the lenses 19 and 20 through each slide and the objective lens 21, and the image from the slide thus is projected forwardly from the front wall of the case for viewing in a conventional manner. The usual controls are provided, herein on the left portion of the rear wall 32 of the case, for manual and preferably automatic operation of the projector. For example, these controls typically include an "on-off" switch knob 38, a reversing switch button 39, an on-off switch button 40 for an automatic control (not shown) providing timed automatic operation, a knob 41 for setting the timed viewing interval for each slide during automatic operation, and a manually operable cycle switch button 42 for manually initiating a slide change.

Preferably, a remote-control console 43 is detachably mounted in a recess in the rear wall 32 and carries the cycle button 42, the reversing button 39, and the timer button 40, and an extension cord (not shown) is provided to connect this console to a plug-in socket 44 when remote-controlled operation is desired. Although these controls are desirable, and usually are included in a projector, it is to be understood that they are shown herein only for purposes of illustration, and do not constitute the present invention.

Figure 2:
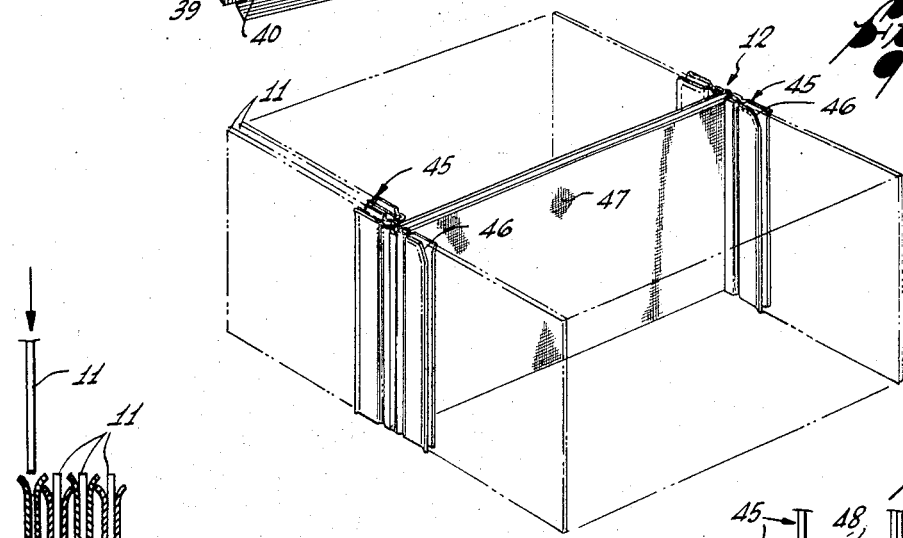
FIG. 2 is an enlarged perspective view of the slide holder of FIG. 1, shown in the storage condition, with the positions of the slides thereon indicated in broken lines.

The slide holder 12 for which the projector 10 is designed comprises a series of slide-gripping elements disposed in closely spaced side-by-side relation and flexibly joined together in an endless series, to receive one edge portion of a slide 11 in each gripping element and then hold the slides in outwardly projecting relation, as shown most clearly in FIGS. 1 and 2. While the holder may take various forms, the preferred form shown herein comprises an endless belt 47 of fabric or the like, forming the flexible connection, and a plurality of spring metal clips forming the gripping elements 45.

Figure 3:
FIG. 3 is an enlarged fragmentary cross-sectional view taken in a vertical plane through the slide holder of FIG. 2 and illustrating one way of inserting slide in the clips of the holder.

Each clip 45 has a flat base 48 (FIG. 5) that is secured to the outer side of the belt 47, and two spring arms (see FIGS. 2 and 3) which project away from the belt and are arranged to receive a slide between them, and to hold the slide frictionally in place. The free outer edges of the arms preferably are inclined away from each other to facilitate insertion of a slide, and the ends of the arms may be similarly inclined away from each other to permit insertion of slides through the ends, as shown in FIG. 3. In addition, one of the spring arms preferably has a flared bevel 46 (see FIGS. 2 and 6) at one end for receiving a corner of a slide, which then can be slid edgewise into the fully inserted position. It can be seen in FIGS. 1 and 2 that the clips extend transversely across the full width of the belt, and are closely packed together for a very compact arrangement of slides.

In accordance with a primary aspect of the present invention, the projector 10 has supporting means in the recess 13 for freely receiving an endless flexible slide holder 12, loaded with a series of slides 11, edgewise through the access opening 15 when the cover door 17 is open, positioning the holder and the slides thereon for projection as an incident to placement of the holder loosely over the supporting means, and then being manually expanded to apply the proper tension to the slide holder, all in a quick and simple operation making it possible to handle unsupported slide holders as slide cartriges without the bulky and relatively expensive magazines that were required in the projector disclosed in the aforesaid patent. These unsupported slide holders can be very compactly stored with a full supply of slides in the "block" condition shown in FIG. 2. Moreover, in the preferred embodiment of the invention, the supporting means is adaptable quickly and easily to accept slide holders of substantially different predetermined sizes and slide capacities, and to apply preselected spring tension to the holders of each size, with a simple and conveniently operated expanding mechanism.

Figure 6:
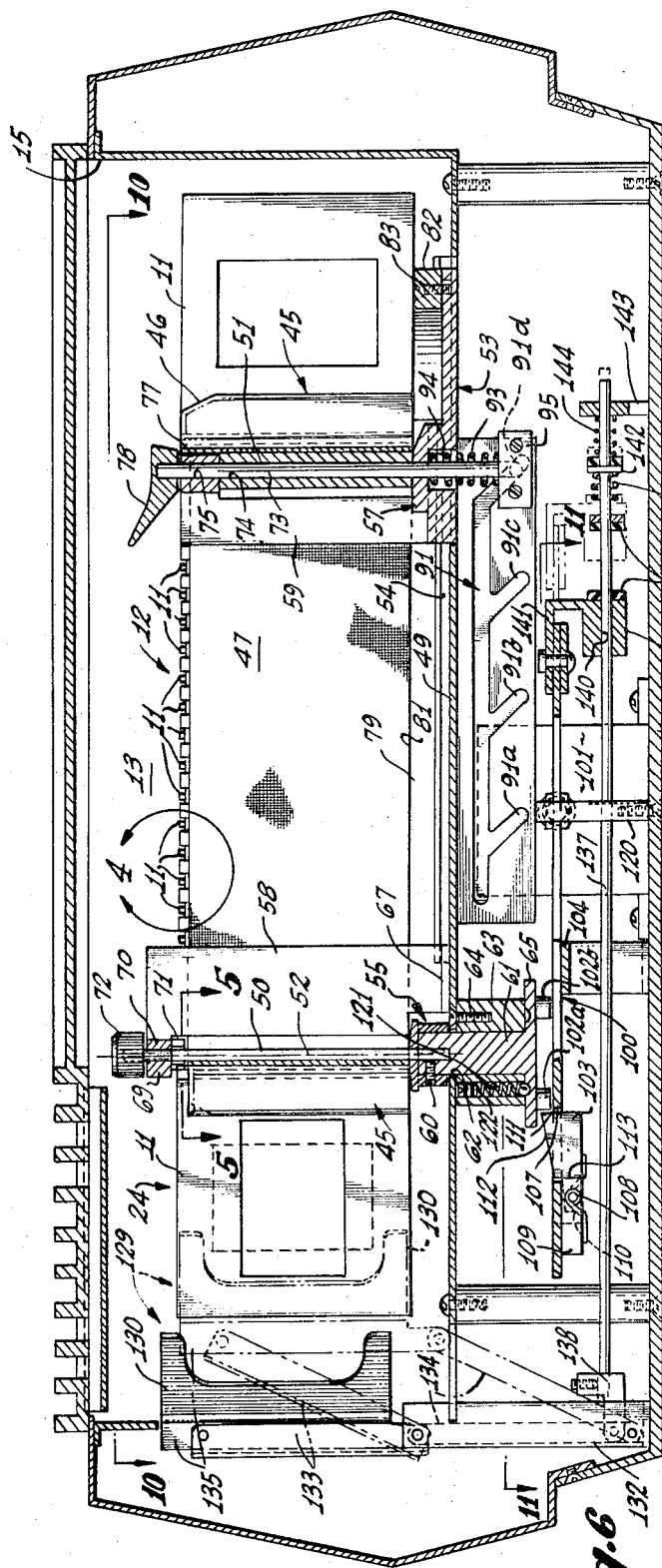
FIG. 6 is an enlarged transverse cross-sectional view taken along line 6—6 of FIG. 1, through the slide-projection station and substantially perpendicular to the optical axis of the projector.

As shown most clearly in FIG. 6, the slide-receiving recess 13 of the preferred embodiment of the projector 10 has a flat bottom wall formed by a horizontal base plate 49 which is spaced above the bottom wall 28 of the case, and the supporting means for slide holders comprise two supporting elements 50 and 51 projecting upwardly from the base plate toward the access opening 15 in spaced, parallel relation. One supporting element 50 is a shaft that rotatable about a fixed axis 52 adjacent the projection station 24, and the other element 51 is a cylindrical roller that is carried by a slide 53 that is movable laterally back and forth along a horizontal slideway 54 on the base plate.

The shaft 50 and the roller 51 are supported on the base plate 49 and the slide 53, respectively, by hubs 55 and 57 at their lower ends, and are braced by thin upright brackets 58 and 59 extending along the inner sides of the shaft and the roller (that is, between them) so that a slide holder 12 may be dropped loosely over the supporting elements without any interference from the associated mounting structure. After a slide holder has been placed around the shaft and the roller, with the latter in the contracted condition, the roller is moved away from the shaft and positioned to tension the holder, after which the projector is ready for operation. During such operation, slides are fed one by one into a projection position (see FIG. 6) extending laterally from the shaft across the optical axis of the projector in the projection station 24, in response to step-by-step rotation of the shaft 50 through selected angular increments of rotation sufficient to move the belt 47 an amount approximately equal to the width of one clip 45.

More specifically, the hub 55 of the shaft 50 is held on the shaft by a set screw 60 (FIG. 6) and is rotatably supported above the base plate 49 by a stem 61 which extends upwardly into the hub through a circular hole 62 in the base plate. Beneath the base plate, the stem is journaled in a sleeve 63 which is fastened to the underside of the base plate by screws 64, one screw being shown in FIG. 6. A flange 65 on the lower end of the stem bears against the lower end of the sleeve and is rotatable with the hub and the shaft.

The bracket 58 bracing the shaft 50 extends upwardly along the right or inner side of the shaft, as viewed in FIGS. 6 and 10, and has horizontal base tabs 67 that are fastened to the base plate 49 by screws 68. A laterally projecting arm 69 at the upper end of the bracket is spaced above the hub 55 a distance greater than the width of the belt 47, and is formed with a bore 70 through which the upper end portion of the shaft 50 extends, thus rotatably bracing this end of the shaft. Driving teeth 71 are formed on the shaft beneath the arm 69 and project radially from the arm one-hundred-and-eighty degrees apart, and a knurled cap 72 is pressed onto the shaft above the arm.

It can be seen that the shaft 50 thus is mounted to support a slide holder 12 with a slide 11 extending laterally, to the left in FIG. 6, across the optical axis in the projection station 24. For optimum positioning of slides, the shaft is of polygonal cross-section, preferably square, and the increments of rotation of the shaft correspond to the number of flat sides it has, 90° with a square shaft.

The hub 57 of the roller 51 (see FIG. 6) is non-rotatably secured to the slide 53, and the roller is rotatably supported on an elongated, upright pin 73 which extends upwardly from the hub through a coaxial center bore 74 through the roller. The bracing bracket 59 is suitably fastened at its lower end to the slide, on the left or inner side of the roller as viewed in FIGS. 6 and 10, and extends upwardly alongside the roller to a level spaced above the hub a greater distance than the width of the belt 47. The upper end portion of the pin extends through a bore 75 in a laterally projecting arm 77 on this bracket, which thus braces the pin 73 and the roller 51. A knob 78 is fastened to the upper end of the pin, above the arm 77. In this manner, both the shaft 50 and the roller 51 are supported from the lower ends, and are braced from their inner or adjacent sides, to receive the slide holder freely around them when they are more closely spaced than the length of the opening in the slide holder.

To complete the means for initially supporting slide holders 12 in the projector 10, transverse guide rails 79 and 80 (see FIGS. 7, 10 and 12) are mounted on the base plate 49 on opposite sides of an imaginary line drawn between the two supporting elements, with flat upper surfaces 81 at the proper level for the lower edges of slides carried by a slide holder, as shown most clearly in FIGS. 7 and 12. In addition, an arcuate guide rail 82 (FIGS. 6 and 10) is fitted between the right end portions of the transverse guide rails, with its flat upper surface 83 at the same level, this level also being the level of the uppermost surfaces of the two hubs 55 and 57.

Accordingly, as a slide holder 12 is inserted edgewise into the projector 10, the lower edge of the belt comes to rest against the upper surfaces of the hubs, and the lower edges of the slides on the holder come to rest against the guide rails 79, 80 and 82, so that the holder is positioned at the proper level for projection of the slides, even before the roller 51 is moved away from the shaft 50 to tension the belt 47. The upper surfaces of the hubs are beveled to facilitate proper movement of the holder and slides around these hubs, particularly around the square shaft 50 where there is no guide rail, and the left end portions 84 (FIG. 10) of the guide rails 79 and 80 also are beveled to form inclines for avoiding catching of slides moving in either direction from the projection station 24 onto the guide rails. It will be noted that the bevel on the hub 55 also serves to guide the belt up to the proper level as it is tensioned, if there is any tendency to sag before such tensioning.

As shown most clearly in FIGS. 10 and 12, the slideway 54 for the roller-supporting slide 53 is formed by two spaced bars 85 lying along opposite sides of the path of the slide and having longitudinal ribs 87 on their adjacent sides spaced above the base plate 49 and slidably received in grooves in the sides of the slide. This forms a dovetail support for the slide permitting it to move through a substantial range. The arcuate guide bar 83 is secured to the top of the slide by two fasteners 89 (FIG. 10), and thus moves back and forth with the slide, in a fixed position relative to the roller 51.

Another important aspect of the invention is the manner in which the slide 53 is selectively positioned relative to the fixed shaft 50 to accommodate slide holders of various sizes and slide capacities, and in which a selected, approximate spring force is applied to properly tension the slide holder in each operative position. As shown in FIGS. 6 and 12, the pin 73 which supports the roller 51 extends downwardly through the hub 57 and the slide 53, and a follower 90 is secured to the lower end of the pin to engage a track 91 on an elongated positioning bar 92 which is suspended from the underside of the base plate 49. The track herein is a groove in one side of the bar, at least as long as the full range of motion of the slide, and the follower 90 is a laterally projecting extension of the pin 73 which fits slidably into the groove.

At selected intervals along the track groove 91, branch grooves 91a, 91b, 91c, and 91d intersect the main groove and are inclined downwardly and to the right (FIG. 6) therefrom at angles of about 45°. Thus, the follower 90 on the pin 73 is movable back and forth along the main groove as the slide 53 and roller 51 are moved toward and away from the fixed shaft 50, and the follower is movable into any selected branch groove 91a, 91b, 91c or 91d. To permit such movement, the pin 73 is vertically slidable relative to the bracket 59, the roller 51, and the slide 53, and the knob 78 on the upper end of the pin forms a conveniently accessible grip for use in effecting both up and down shifting of the pin and lateral sliding of the pin-and-slide assembly.

Telescoped onto the lower end portion of the pin 73 is a coiled compression spring 93 which is fitted at its upper end into a recess 94 in the underside of the slide 53 and is compressed between the bottom of this recess and a block 95 that is clamped on the lower end of the pin and rides along the side of the bar 92. The follower projects out of the side of the block and into the track 91 in the positioning bar 92. Thus, the spring acts between the slide and the block 95 urge the pin 73 downwardly relative to the slide, and similarly urges the follower 90 downwardly relative to the positioning bar.

Whenever the follower 90 is aligned with the upper, entry end of one of the branch grooves and the pin 73 is released, the spring 93 shifts the follower downwardly into the aligned branch groove, and the upwardly facing but inclined wall of the groove serves as a ramp which cooperates with the follower to cam the pin, and thus the slide 53 and the roller 51, to the right, in a direction to tighten the slide holder 12 around the positioning elements 50 and 51. The range of lateral motion of the slide while the follower 90 is in each branch groove is designed to expand the positioning elements from a size smaller than the minimum internal size of a slide holder of a given capacity (when the follower is at the top of the groove) to a size larger than the maximum size of such a holder (when the follower is at the bottom of the groove). The follower should not "bottom out" in a branch groove, because this would prevent the application of the proper tension to the holder. This arrangement accommodates variations in sizes of holders of a given capacity resulting from such things as variations within manufacturing tolerances, stretch, and changes due to temperature variations, while insuring that the tensioning force applied to each holder, regardless of capacity, is substantially the same.

The horizontal portion of the main positioning groove 91 immediately to the left (FIG. 6) of each branch groove provides a "rest" position for the follower 90 in a contracted condition for each of the expanded conditions, four capacities being provided for in the illustrative projector. To contract the supporting elements 50 and 51 preparatory to insertion of a slide holder 12, the operator simply pulls up on the knob 78 and pushes it to the left, thereby sliding the follower out of the branch groove it is in, and then sliding it along the main groove to the rest position. When the knob is released, the spring 93 urges the follower downwardly against the lower wall of the main groove, and thereafter exerts a frictional braking force for maintaining the slide 53 stationary as a slide holder is fitted into the projector.

A calibrated marker 97 (FIG. 10) may be provided along the path of a pointer 98 on the slide, and marked to indicate the different positions of the slide for holders of the different capacities. This marker preferably is a transparent insert in the base plate 49 and is illuminated from below for convenient changing of slide holders in the dark. The capacities of the illustrative projector, in numbers of slides held, are shown by the indicia "40," "60," "80" and "100" on the marker in FIG. 10, although the projector may be adapted for only one size, or for any combination of different capacities within the practical limitations imposed by the size of the case that is to be used.

Another feature of the improved projector 10 is the relatively simple and inexpensive drive mechanism, shown most clearly in FIGS. 6 and 11, for driving each slide holder 12 step by step and reversibly, at very high speed and with little noise. In general, this drive mechanism comprises a reciprocating drive motor 99 in the form of an electromechanical solenoid, a driver 100 moved back and forth through drive and return strokes each time the solenoid is actuated, a ratchet coupling between the driver and the hub for advancing the square shaft 50 through its selected increment during each drive stroke, and a second solenoid 101 for changing from forward to reverse operation, and back.

As will be seen in FIGS. 6 and 11, the ratchet coupling includes a plurality of angularly spaced abutments, herein pins 102, depending from the underside of the flange 65 rotatable with the square shaft 50 and arranged around the axis of the shaft, and at least one ratchet lug 103 carried by the driver and reciprocable back and forth beneath the flange to engage successive pins and turn the flange and the shaft through the selected increment during each forward stroke of the driver, returning idly without moving the driver back during the return stroke. In this instance, there are four pins equally spaced around the axis of the shaft, and the driver 100 is simply an elongated flat plate, which may be a sheet metal stamping. This plate is disposed in a generally horizontal position beneath the base plate 49 and is slidable back and forth, herein transversely of the case, on top of an inverted U-shaped stand 104 that is fastened to the bottom wall of the case.

The left end portion of the driver 100 extends to the left beyond the flange 65 and preferably carries two side-by-side ratchet lugs 103 and 105 adjacent its left end. These lugs are disposed in opening 107 in the driver, and are pivoted on pins 108 on the underside of the driver to swing downwardly from the raised positions shown in FIG 6, the pins being carried on yokes 109 shown most clearly in dotted lines in FIG. 11. Wire springs 110 hold the lugs yieldably in the raised positions shown, in which generally vertical left sides 111 of the lugs project upwardly above the driver and in which the flat upper sides 112 of the lugs are inclined upwardly and toward the right from the top of the driver. The springs permit the lugs to yield downwardly in response to depressing forces applied to the inclined upper sides, but upward swinging of the lugs from the raised position shown is blocked by stops 113 (FIG. 6) on the yokes 109 engaging the left sides of the lugs.

The main solenoid 99 is connected to the right end of the driver 100 to shift it back and forth through the selected increment of movement as the plunger 114 of the solenoid is moved back and forth in the usual way. Herein, the plunger normally is hold in an extended position (as shown in full lines in FIG. 11) by a compression spring 115 coiled around the plunger, and is retracted when the coil (not shown) of the solenoid is energized. This motion is transmitted to the driver through a horizontally swingable lever 117 pivoted between its ends on a pin 118 upstanding from the bottom wall 28 of the case, and pivotally connected at its opposite ends to the plunger 114 and to the driver 100.

The fulcrum pin 118 of the lever 117 is closer to the plunger 114 than to the driver 100, to increase the length of stroke of the driver relative to the stroke of the plunger. It will be evident that the solenoid 99 could be directly connected to the driver, and that the lever arrangement is primarily a convenience permitting compact side-by-side mounting of the driver and the solenoid and providing versatility as to the stroke length.

When the driver 100 is in the position shown in full lines in FIG. 11, with its side surface 119 abutting slidably against a guide pin 120, the ratchet lug 103 is aligned with the abutment pin indicated at 102a so that, upon movement of the driver to the right by the solenoid 99, this lug 103 engages the abutment pin 102a and pushes it to the right, clockwise about the axis 52 of the square shaft 50, to the position indicated at 102b, thus turning the shaft clockwise through an angular increment determined by the extent of movement of the pin 102a as the lug moves to the position indicated at 103a. The stroke of the driver, after engagement of the lug with the pin, is selected to produce the desired increment of indexing of the shaft, herein 90°.

For precisely locating the shaft 50 at the end of each indexing step, a spring-loaded ball detent 121 (FIG. 6) is mounted in a bore 122 in the sleeve 63 above the flange 65 and positioned to seat in one of four recesses in the upper side of the flange. This latches the shaft releasably in each new position after each indexing stroke of the driver.

When the main solenoid 99 is deenergized, the spring 115 snaps the plunger 114 back to its extended position, thereby pushing the driver 100 back to the left through its return stroke. It will be seen in FIG. 11 that each forward stroke (to the right) of the driver indexes one pin 102 from the position 102a while moving another to this position, which is in line with the lug 103 during its return stroke. The inclined upper 112 of the lug engages the pin in the position indicated at 102 during the return stroke, and acts as a cam for depressing the lug sufficiently to pass the pin without changing its position, the pin being held in place by the ball detent 121. The lug then snaps back to the raised position, ready for the next forward stroke of the driver.

In the foregoing manner, successive cycles of the main solenoid 99 index the square shaft 50 step by step in one direction, clockwise as described above, to feed successive slides 11 into the projection station 24. It should be noted that these cycles may be made very rapid, so that the entire slidechanging operation is accomplished with a simple "flip" action in a fraction of a second.

The reversing solenoid 101 is connected to the driver 100 to rock it about the pivotal connection 123 at the right end, between the dotted and full line positions in FIG. 11, and brings the ratchet lug 105 into position to index the square shaft 50 reversely when the driver is in the dotted line position. For this purpose, the plunger 124 of this solenoid is pivotally connected to the driver, to the left of the pivot 123, by means of a pin passing through an elongated slot 125 in the driver for accommodating the back and forth motion of the driver during its driving and return strokes, the longitudinal axis of this slot being parallel to the direction of reciprocation during reverse operation. The reversing solenoid is deenergized for forward operation, and a spring 127 holds the plunger in the extended position shown, thereby activating the ratchet lug 103. When the reversing solenoid is energized, the plunger is retracted (in the direction of the arrow 128), thereby swinging the driver 100 to the dotted line position and activating the ratchet lug 105 by swinging it to the position indicated at 105a.

In this position, the lug 105 is aligned with the abutment pin 102 in the position indicated at 102c, to shift the pin to the right, counterclockwise about the axis 52 of the square shaft, to the position indicated at 102*d* during the forward stroke of the driver 100. This turns the shaft counterclockwise through an angular increment of ninety degrees, and thus feeds the slide holder reversely in the projector. In all other respects, reverse operation is identical to forward operation.

A slide-positioning device 129 locks each slide 11 quickly and positively into the proper plane for projection as an incident to the feeding of the slide into the projection station 24. As shown in FIGS. 6 and 10, this device includes a plate 130 of generally V-shaped cross-section which is supported alongside the projection station, on the side thereof opposite the square shaft 50, with the vertex of the V aligned with shaft and formed with a vertical groove 131 sized to receive the edge of a slide with a close fit. This plate, hereinafter referred to as the positioning fork, is supported on one side of a parallelogram linkage (four links 132, 133, 134 and 135), one link 132 of which is fastened in an upright position to the bottom wall 28 of the case with the second link 133 pivotally connected to its upper end, the third link 134 pivotally connected to its lower end, and the forth link 135 pivotally connected between the free ends of the second and third links and carrying the positioning fork 130. The links are coupled for movement into a vertically aligned retracted arrangement shown in full in FIG. 6, and for swinging to the right to the extended position shown in broken lines in FIG. 6. Since the positioning fork 130 is carried on the link 135, which remains parallel to the fixed vertical link 132, the fork also remains vertical while moving to the right and dropping slightly below the full-line position shown. The links are arranged to nest together in the vertically aligned condition.

With this arrangement, the back-and-forth motion of the driver 100 may be utilized to operate the positioning fork 130 in precisely timed relation with the feeding of slides 11 into the projection station 24, during the final portion of the stroke of the driver after a new slide has been brought into the zone of reach of the fork. To this end, an elongated connecting rod 137 is pivotally connected to the lower movable link 134 of the parallelogram linkage above the lower pivot thereof, herein by a fitting 138 that is adjustable on the connecting rod, and extends across the projector beneath the driver 100 and loosely through a connector 139 pivotally carried by the driver beneath the right end (FIGS. 6 and 11) thereof. Herein, the connector is shown as a block with a bore 140 through which the rod extends, and an L-shaped bracket 141 loosely pinned to the driver for movement therewith and for swivelling motion thereon.

Beyond the connector 139, the connecting rod 137 has an annular collar 142 that is secured thereto, in spaced relation with the connector (when the driver is in the position shown in full lines), and extends slidably through a hole in a supporting bar 143 projecting upwardly from the bottom wall of the case. A coiled spring 144 is compressed between the collar and the supporting bar to urge the connecting rod to the left and hold the linkage and the positioning fork in the retracted, full-line positions in FIG. 6, while permitting movement of the connecting rod to the left to pull the linkage to the extended, broken-line position.

Telescoped onto the connecting rod 137 between the connector 139 and the collar 142 is a short cushioning spring 145 which is stiffer than the return spring 144, and which is considerably shorter than the spacing between the connector 139 and the collar 142 when the driver 100 and the positioning fork 130 are retracted. A washer 147 is disposed between the connector and the cushioning spring to be engaged by the connector as it moves to the right, during the forward stroke of the driver, so as to press the cushioning spring 145 against the collar 142 and thereby urge the connecting rod 137 to the right against the action of the return spring 144.

This couples the driver 100 to the connecting rod 137 in a cushioned and yieldable manner, after a preselected amount of motion of the driver sufficient to bring a new slide 11 almost into the projection station 24, and then uses the remaining motion of the driver to draw the positioning fork 130 into engagement with the slide. In addition to providing the necessary delay for slide movement into the projection station, this lost-motion connection avoids overloading of the main solenoid 99 during the initial portion of its stroke when its force output is lowest, and applies the load of the fork to the solenoid only during the final portion of the stroke when the force output is highest. Thus, the fork is pulled quickly and firmly into engagement with the slide. The spring 145 cushions the force applied to the slide through the fork, and the elongated V of the fork distributes the force over a substantial area to minimize danger 'f deformation of the frames of slides during prolonged periods of repeated use. It should be noted that the sound of impacts between the connector 139 and the washer 147 may be deadened by ring-like pads 148 on the connector and the washer.

To insure that a given increment of turning of the square shaft 50 produces a corresponding amount of feeding of the slide holder 12, the slide holder is constructed to cooperate with the detents or teeth 71 on the upper end portion of the shaft to provide a positive drive coupling which utilizes the slide-holding clips 45 as driving abutments. This can be particularly significant when the clips are supported by a fabric belt 47 which is more susceptible to slipping on the shaft, and which also would be unsuitable for a positive, toothed connection to the driving shaft.

Figure 4:
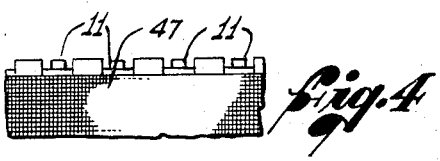
FIG. 4 is an enlarged fragmentary plan view of part of the slide holder, the view being taken within the arc 4 of FIG. 6.
Figure 5:
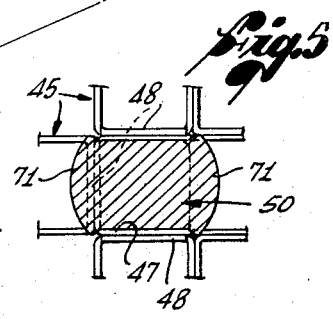
FIG. 5 is an enlarged fragmentary cross-section view showing the positions of slide clips around the fixed positioning shaft of the projector, this view being taken along line 5—5 of FIG. 6.

More specifically, and as shown most clearly in FIGS. 4, 5 and 6, alternating recesses and driving abutments are provided by alternate clips 45 in the series of clips on the belt, for engagement with the teeth on the shaft, by using clips of two different lengths and alternating the two lengths around the belt. The shorter clips have about the same length as the width of the belt, or a slightly greater length, and the longer clips project beyond the upper edge of the belt farther than the shorter clips, and far enough to serve as the driving abutments for engagement with the teeth 71 on the square shaft, when the teeth project into the recesses between the longer clips.

As shown most clearly in FIG. 5, the teeth 71 on the shaft 50 are arcuate tabs which project radially from the opposite sides of the upper end portion of the shaft, level with the spaces between the ends of the longer clips, and thus extend into the spaces in interlocking relation with the longer clips as the latter pass around the shaft. Should the belt 47 tend to slip, the teeth 71 block such slipping and thus insure that the slides are advanced into the proper range to be picked up by the positioning fork 130.

To provide a safety drop-out of the drive mechanism when the cover is open, and also for quick scanning of a series of slides 11 on a slide holder 12 in the projector 10, a switch 149 (FIG. 8) is mounted in the projector, and an operator in the form of a pin 150 (FIGS. 1 and 8) is positioned on a swingable edge of the cover 17 to move into an operable position (FIG. 8) as the cover is moved to a nearly closed position, and to actuate the switch 149 in response to momentary depression of the cover from the nearly closed position. When the cover is pressed into the fully closed position (FIG. 9), the scanning switch is held closed and the controls shown on the rear wall in FIG. 1 are activated for normal operation.

Figure 8:
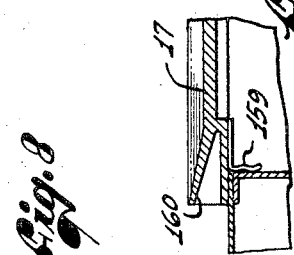
FIG. 8 is an enlarged fragmentary cross-sectional view taken substantially along line 8—8 of FIG. 1 after the cover door has been placed in a nearly closed position.

As shown in FIGS. 1 and 8, the operator pin 150 is pressed into a recess 151 in the cover 17 to extend away from the latter, and the switch 149 is supported below the closed position of the cover and provided with an actuating button 152 which, when depressed from the raised position in FIG. 8, actuates the main drive solenoid 99 to initiate a cycle of the driver 100. A disk 153 engaging the actuating button 152 is guided in a sleeve 154 extending upwardly toward a rim 155 (see FIG. 1) surrounding the access opening 15, and a spring 157 is positioned in the sleeve between the disk 153 and a second disk 158 which is held against the underside of the rim 155. A cylindrical head on top of the upper disk 158 fits loosely into a hole in the rim 155, the hole being positioned to receive the lower end of the operator pin 150 as the cover 17 is moved to the closed position. The head of the disk 158 may have a cylindrical recess for receiving the pin 150.

Accordingly, as the cover 17 is moved toward the closed position, the pin 150 moves into engagement with the upper disk 158 and, unless pressed to the fully closed position, comes to rest as illustrated in FIG. 8. The various parts hold the cover in this position without actuating the scanning switch 149. However, when the cover is pressed down with a light force and then released, the switch button 152 is depressed, actuating the solenoid 99 to advance the slide carrier 12 through one step. With this arrangement, the cover can be tapped repeatedly and in rapid succession to scan the slides in the holder. In a dark room of the type normally used for the viewing of slides, this is a very convenient way to check the slides rapidly.

Figure 9:
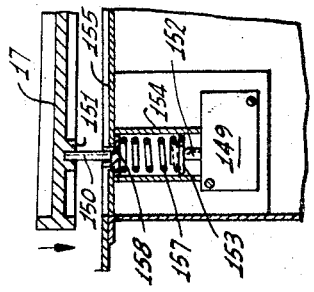
FIG. 9 is an enlarged fragmentary cross-sectional view taken substantially along line 9—9 of FIG. 1 after the cover door has been placed in a fully closed position.

On the front edge of the cover 17, generally in the center, is a latch spring 159, which is shaped to engage the top wall adjacent the access opening and to be pressed into the latched position shown in FIG. 9. Thus, the cover can be pressed firmly into the fully closed position, and latched therein for normal operation. As this is done, the scanning switch 149 is actuated as the cover moves through the scanning position, and is latched in when the cover is latched in the closed position, leaving the projector ready for operation by means of the normal controls. Switches having the foregoing capabilities are well known in the art, so the details of the switch 149 are not shown herein. To facilitate opening of the cover, a gripping recess 160 (FIGS. 1 and 9) is formed in the rear edge of the cover adjacent the center.

A modified form of the projector 10 is shown in FIGS. 13-15, in which many of the basic parts are the same as those previously described, and thus are indicated by the same reference numbers. The first modification illustrated in these figures is a hold-out apparatus 161 which is operated by the projector drive mechanism to engage both slides 11 on opposite sides of the slide in the projection station 24, and to press them positively away from the projection station, thereby cooperating with the square shaft 50 in keeping these slides out of the light beam, and also serving to draw the belt 47 tightly around the square shaft for optimum positioning of the slide held between the shaft and the positioning fork 130.

The hold-out apparatus 161 comprises a rocker shaft 162 suspended beneath the base plate 49, generally parallel to the optical axis on two depending lugs 163 fastened to the underside of the base plate, two spring arms 164 extending generally radially from the rocker shaft in alignment with two slots 165 in the base plate, and an actuating rod 167 connected between a radial crank arm 168 on the rocker shaft and the lower movable link 134 of the parallelogram linkage for actuating the positioning fork 130. As the link 134 swings to the right (FIG. 15) during movement of the positioning fork into engagement with a slide 11 in the projection station 24, the actuating rod 167 is shifted to the right to turn the crank arm 168 and the rocker shaft 162 clockwise, swinging the spring arms 164 upwardly and to the right through the slots 165 from the lowered or retracted positions shown in full lines in FIG. 15 to the raised positions shown in broken lines.

This motion of the spring arms 164 moves their free end portions into pressing engagement with the two slides 11 on opposite sides of the slide in the projection station 24, and presses them firmly to the right, away from the slide being projected, thus tensioning the belt while holding the slides positively out of the light beam from the lamp 18. As the positioning fork 130 is disengaged, movement of the link 134 back to the left rocks the shaft 162 counterclockwise to return the spring arms to the retracted positions to permit movement of the slide carrier 12 to bring a new slide into the projection station.

Another modification in FIGS. 13 and 14 is a shutter 169 for blocking the light beam from the lamp 18 whenever the slide holder 12 is being driven to feed a new slide 11 into the projection station 24, thus preventing possibly objectionable light flashes on the viewing screen. This shutter also is operated in timed relation with the slide holder 12 by coupling it to the projector drive mechanism, herein through the rocker shaft 162.

For this purpose, and as shown in FIGS. 13 and 14, the shutter, which herein is a disk sized to cover the inner end of the objective lens barrel 22, is carried on one end of an L-shaped arm 170 that is coupled to the rocker shaft 162 adjacent one end thereof, the lower end as viewed in FIG. 13. The angular position of the L-shaped arm is such that the shutter disk is oscillated back and forth between a "closed" or blocking position shown in full lines in FIG. 14 (when the positioning fork 130 is retracted) and an "open" position shown in broken lines (when the positioning fork is extended into engagement with a slide).

It will be seen in FIG. 14 that the arc 171 through which the spring arms 164 travel is greater than the arc 172 of oscillation of the shutter disk 169, this difference being included primarily for clearance considerations. To produce this difference, the shutter disk is mounted on the rocker shaft 162 by means of a hub 173 in the form of a sleeve rotatable on the rocker shaft, and a radial pin 174 on the shaft projecting outwardly through enlarged notch in 175 in the hub sleeve with a clearance fit, so as to form a lost-motion connection for dissipating part of the angular motion of the rocker shaft.

In other words, the pin 174 has a limited amount of angular travel relative to the hub 173, and thus turns the hub to oscillate the shutter disk only during the remaining travel. Stop pins 177 and 178 abut against opposite sides of the L-shaped arm 170 to determine the two positions of the shutter disk.

SUMMARY OF OPERATION

Although the manner of operation of the projector 10 of the present invention should be apparent from the foregoing, it is believed that a brief summary of the operating procedures may contribute to a better understanding and appreciation of the features and advantages of the projector. Assuming that the projector has been positioned relative to a screen and plugged in to an appropriate power source, and that a supply of slides 11 to be viewed is conveniently accessible, typically in storage boxes (not shown) in which the holders 12 are in the compact, block-like condition of FIG. 2, the projector may be turned on to activate the exhaust blower and the lamp 18, and the cover 17 is opened, as shown in FIG. 1, to receive the first slide holder and the slides 11 thereon to be viewed.

The movable supporting element (roller 51) is located relative to the fixed shaft 50 to receive a holder 12 of the capacity to be viewed, simply by pulling up on the knob 78 and moving the slide 53 until the pointer 98 (FIG. 10) is just to the left of the number ("40," "60," "80," or "100" on the marker 97) corresponding to the size of the holder, and then releasing the knob so that the spring 93 presses the follower 90 against the lower wall of the main groove 91 to hold the slide 53 and the roller 51 releasably in place. Then the slider holder is removed from its container, held in the manner shown in FIG. 1, and fitted into the recess 13 and loosely over the positioning elements 50 and 51.

The belt 47 of the slide holder 12 engages the hubs 55 and 57 as the slides 11 on the holder engage the guide rails 79, 80 and 82, and the holder thus is positioned at the proper level in the projector. If desired, a tab (not shown) may be attached to one slide to indicate the beginning (and end) of the series.

With the slide holder 12 in place, the supporting elements 50 and 51 are expanded by lifting the knob 78 and shifting the slide 53 away from the square shaft 50, to the right in FIG. 1 and to the left in FIGS. 6 and 10, until the pointer 98 is aligned with the appropriate number on the marker 97, and then releasing the knob to the action of the spring 93, The spring then forces the follower 90 down the ramp of the aligned branch groove 91a, 91b, 91c or 91d, and thus cams the slide 53 to the right until the belt 47 is taut, as shown in FIG. 6 for a holder having a 100-slide capacity.

At this point, the projector 10 is ready for operation. The cover 17 may be moved to the nearly closed position (FIG. 8) and used as a convenient actuator for advancing the slides quickly and one-by-one for scanning, or may be pressed into the fully closed position for operation through the normal controls on the rear wall 32. In either case, the actuation of the the scanning switch 149 by the pin 150 on the cover actuates the main solenoid 99 as the cover is depressed, feeding the slide holder 12 to bring the first slide 11 into the projection station 24 and operating the various locating elements, including the fork 130, to position this slide for projection.

Whether the slide holder 12 then is advanced under the control of the scanning switch 149 or under the control of either the cycle switch 42 or the timer 40, the slide-feeding operation is the same. Whenever the main solenoid 99 is deenergized, its plunger 114 is extended (to the right in FIG. 11) and the driver 100 is in its retracted position (to the left in FIG. 11). The positioning fork 130 is retracted, the hold-out arms 164 are in the lowered out-of-the way positions shown in full in FIG. 15, and the shutter disk 169 is in the blocking or "closed" position also shown in full in FIG. 14. This condition, of course, is the deenergized condition which exists only momentarily during normal operation, each time the slide holder 12 is being advanced.

When a slide 11 is to be positioned to be viewed, the condition is changed solely by energizing the main solenoid 99 to draw its plunger 114 inwardly, to the left in the drawings, against the action of the spring 115. When this occurs, the driver 100 is shifted rapidly to the right and the ratchet coupling acts through the pins 102 to turn the hub 55 and the square shaft one step, in a direction determined by the condition of the reversing solenoid 101. If the solenoid is deenergized as shown in full in FIG. 11, the direction is clockwise, or forward. If the solenoid is deenergized, the direction is counterclockwise, or reversely.

As previously mentioned, the initial portion of the stroke of the driver 100 turns the square shaft 50 and feeds the slide holder 12 far enough to bring a new slide 11 into the reach of the positioning fork 130, before the connector 139 on the driver is coupled to the connecting rod 137 by the cushioning spring 145 and the collar 142 on the connecting rod. Then, the remaining portion of the stroke of the driver acts through the connector, the cushioning spring and the collar to shift the connecting rod 137 to the right.

As this occurs, the positioning fork 130 is drawn into engagement with the slide 11 to be projected, to cam the left edge of the slide into the groove 131 in the fork and to clamp the slide between the fork and the square shaft 50. At the same time, the hold-out arms are pressed against the two adjacent slides to press them away from the projection station 24, and the shutter disk 169 is shifted away from the lens barrel 22 to the "open" position.

It bears emphasis that all of these operations that are effected by the connecting rod 137 occur during the final portion of the stroke of the driver 100 and the main solenoid 99, when the force output is at its peak. It has been found that about ten percent of the total stroke, or one-sixteenth inch, is sufficient and, of course, all of these operations occur very rapidly and in precisely timed relation with each other.

As long as the main solenoid 99 remains energized, a slide is held in the projection station 24 and will be projected on the viewing screen. Since cooling air is drawn continuously through the case and past the projection station, the slide therein is cooled sufficiently to prevent distortion. Thus, it is possible to view a slide for as long as is desired without need for refocusing.

When a slide is to be changed, all that is necessary is the momentary deenergization of the main solenoid 99, so that the spring 115 can extend the plunger 114 to retract the driver 100 and the positioning fork 130 while lowering the hold-out arms 164 and closing the shutter disk 169. When the solenoid is reenergized (preferably immediately), the driver is pulled back to the right to index the square shaft 50 and restore all of the other parts to the slide-projecting condition.

It should be noted that it is quite simple to change slides 11 in a slide holder 12 while the latter is in the projector 10. When the cover 17 is open, a slide can be pulled out of its clip 45 for replacement by another slide, to change its position in the clip, or to rearrange the slides in the holder, since the slides can be fitted edgewise back into the clips in the manner illustrated in FIG. 3. When a new slide holder is to be placed in the projector, the roller 51 is simply shifted toward the square shaft 50, using the knob 78 to contract the supporting elements to the proper position, thereby freeing the holder in the projector for removal, the "used" holder is lifted out through the access opening, and the new holder is placed around the supporting elements. Then the knob 78 is pulled upwardly and shifted back to the right until the follower 90 is in alignment with the appropriate branch groove, and is released to the action of the spring 93 which applies the proper tension to the belt 47.

From the foregoing, it will be apparent that the present invention provides a new and improved slide projector 10 having a number of significant features which cooperate to make the projector very simple to use and relatively simple and effective in operation. It also will be apparent that, while preferred embodiments of the projector have been illustrated and described, various modifications may be made without departing from the spirit and scope of the invention.

We claim:

1. A slide projector having, in combination:
   a case having a top wall, an internal recess, an access opening in said top wall over said recess, and a cover door overlying said recess and movable between open and closed positions;
   an optical system in said case having an optical axis extending through one side portion of said recess and through a slide projection station in said one side portion;
   an unsupported endless flexible slide holder disposed in said recess and comprising an endless series of elongated slide-gripping clips flexibly joined together by an endless belt and arranged to hold a series of slides in side-by-side relation with each slide gripped along one edge and projecting outwardly from the holder;
   an upright shaft in said recess extending through said slide holder beside said projection station and having an upper end adjacent said access opening;
   an upright roller extending through said slide holder and spaced from said shaft on the side thereof remote from said projection station, said roller also having an upper end adjacent said access opening;
   means supporting said roller for movement toward and away from said shaft and permitting said slide holder to be fitted freely around said roller and said shaft through said access opening when more closely spaced than the length of the space within said slide holder;
   means supporting said shaft for rotation about a fixed axis and also permitting said slide holder to be fitted freely around said shaft through said access opening;
   positioning surfaces in said recess for limiting downward movement of said slide holder into the recess to a preselected level and maintaining the holder at the preselected level when the holder is loosely fitted around the roller and the shaft;
   means for moving said roller selectively between a first position closer to said shaft than said length and a second position in which said slide holder is tightened about said roller and said shaft;
   and drive means for turning said shaft step by step through selected increments to drive said slide holder and feed slides one by one into said projection station.

2. A slide projector as defined in claim 1 in which said means supporting said roller include a sliding mount, slideways supporting said sliding mount for movement toward and away from said shaft, means for holding said sliding mount releasably in a preselected range of motion in which the roller is closer to said shaft than said length, and means at the end of said range of motion remote from said shaft for applying a preselected spring force to said sliding mount to urge the latter and said roller away from said shaft to tension said slide holder.

3. A slide projector as defined in claim 2, further including a plurality of sets of said means for holding said sliding mount and said means for applying said preselected force to said slide, and in which said sets are arranged in a longitudinal series extending away from said shaft, to provide for loading and tensioning of slide holders of different lengths and capacities.

4. A slide projector as defined in claim 1 in which said positioning surfaces include hubs around the lower surfaces of said shaft and said roller for engaging said slide holder and guide rails along the path followed by slides on said slide holder to and from said projection station for engaging the lower edges of the slides.

5. A slide projector as defined in claim 4 in which said hubs have bevels inclined from below said level to said level.

6. A slide projector as defined in claim 4 in which said guide rails extend from one side of said shaft, around said roller, and back to the opposite side of said shaft, and have beveled ends adjacent said shaft.

7. A slide projector as defined in claim 1 in which said shaft and said roller are mounted on a base plate spaced above the bottom of said case, and said drive means are mounted beneath said base plate.

8. A slide projector as defined in claim 7 in which said drive means comprise a hub on said shaft extending beneath said base plate, a driver mounted for back and forth movement beneath said hub, a series of depending abutments on said hub radially spaced around the axis of said shaft, a ratchet coupling including at least one lug projecting upwardly from said driver and positioned to pass beneath said hub on one side of the axis of said shaft to engage and move an abutment on said one side portion in one direction of motion of said driver, and to yield and pass the next abutment in the other direction of motion of the driver, and a reciprocating actuator for shifting said driver back and forth to index said hub and said shaft step-by-step in one direction.

9. A slide projector as defined in claim 8 in which said driver normally is held for reciprocation along a first path for engagement of said ratchet coupling on said one side of said axis, and is shiftable to a second path of reciprocation for engagement of said coupling on the other side of said axis, thereby to reverse the direction of feeding of said slide holder.

10. A slide projector as defined in claim 9 further including a second reciprocating actuator connected to said driver and selectively operable to shift said driver from one path to the other.

11. A slide projector as defined in claim 9 in which said driver has first and second ratchet lugs, the first being aligned with abutments on said one side of said axis when said driver is reciprocated along said first path, and the second being aligned with abutments on said other side while said driver is reciprocated along second path.

12. A slide projector as defined in claim 1 in which said drive means include a reciprocating actuator in the form of a solenoid, a driver reciprocable by said solenoid through forward and return strokes, and a ratchet coupling between said driver and said shaft, for indexing the shaft one step during each forward stroke of the driver, said solenoid producing a forward stroke when energized and a return stroke when deenergized, and further including a slide-positioning device engageable with each slide in the projection station from a retracted position on the side of the station remote from said shaft, said device being connected to said driver by a lost-motion connection to be moved into engagement by the driver in timed relation with the indexing of said shaft and only during the final portion of each forward stroke.

13. A slide projector as defined in claim 12 further including hold-out means for engaging the slides on opposite sides of the slide in said projection station and shifting them away from said projection station, said hold-out means being connected to said driver for actuation thereby after each slide has been moved generally into said projection station.

14. A slide projector as defined in claim 13 in which said hold-out means comprise two spring arms disposed on opposite sides of said shaft, a rocker supporting said arms for movement from retracted positions toward said roller to activate positions to engage the slides on opposite sides of said projection station in moving to said active positions, and a link connecting said rocker to said driver for actuation thereby with said slide-positioning device.

15. A slide projector as defined in claim 14 further including a shutter movable back and forth across said optical axis to block and unblock said optical system during slide changing, said shutter being carried by said rocker for actuation therewith by said driver.

16. A slide projector as defined in claim 1 further including at least two lugs projecting outwardly from said shaft alongside one edge of the position of said belt, said slide-holding clips being arranged on said belt with every other clip projecting outwardly beyond said one edge past the ends of the adjacent clips to form alternating recesses and driving abutments along said one edge, said lugs projecting into said recesses to engage said abutments.

17. A slide projector as defined in claim 1 in which said cover door is hinged on said top wall and further including a scanning switch operable when actuated to cause said drive means to feed said slide holder one step, and an actuator for said scanning switch mounted on said cover door to actuate said scanning switch upon depression of said cover door from said nearly closed position toward said closed position.

18. A slide projector having, in combination:
a case having an internal recess and an access opening in one side of said case opening into said recess;
an optical system in said case having an optical axis extending through said recess and through a slide projection station therein;
an endless flexible slide holder disposed in said recess and comprising an endless series of slide-gripping members flexibly joined together and arranged to hold an endless series of slides in side-by-side relation with each slide gripped along one edge and projecting outwardly from the holder;
supporting means for said slide holder mounted on said projector in said recess for receiving said slide holder through said access opening, and including two spaced, parallel supporting elements extending toward said access opening and mounted for selective relative movement between expanded and contracted conditions, to receive the slide holder around said elements in said contracted condition, one of said elements being disposed beside said slide projection station to position successive slides in said station as the slide holder is fed around said supporting elements;
said supporting means also including positioning surfaces facing toward said access opening in a preselected plane to locate the slide holder relative to said supporting elements and said station when the supporting elements are in said contracted condition;
means for moving said supporting elements to said expanded condition to tension said slide holder thereon;
and drive means for feeding said slide holder step-by-step through selected increments about said supporting elements to feed slides one by one into said station, said flexible slide holder being freely insertible over and removable from said supporting means through said access opening when said elements are in the contracted condition.

19. A slide projector as defined in claim 18 in which said one supporting element is a shaft mounted on said projector for rotation about a fixed axis beside said slide projection station and supported from its inner end, remote from said access opening, and from its inner side, adjacent the other of said supporting elements, thereby leaving the outer end and outer side of said shaft unobstructed to receive the slide holder.

20. A slide projector as defined in claim 19 in which said other supporting element is mounted on said projector for movement in parallel with said shaft, toward and away from the latter, to contract and expand said supporting means.

21. A slide projector as defined in claim 20 in which said shaft is square in cross-section and said other element is a cylindrical roller supported from its inner end and inner side for rotation about an axis parallel to said fixed axis and movable toward and away from the fixed axis.

22. A slide projector as defined in claim 19 in which said other supporting element is mounted on a slide movable toward and away from said shaft, and further including means for holding said slide releasably in a position in which said elements are in said contracted condition for loading of the projector with a slide holder, and then shifting the slide away from the shaft to expand the supporting means.

23. A slide projector as defined in claim 22 in which the last-mentioned means also exert a preselected yieldable tensioning force on said slide holder when said supporting means are in said expanded condition.

24. A slide projector as defined in claim 19 in which said other supporting element is a roller, and further including a slide mounted on said projector for movement toward and away from said shaft, a pin carried by said slide and extending through said roller to support the roller rotatably on the slide, said pin being longitudinally slidable relative to said slide and said roller, a grip on the end of said pin adjacent said access opening, means yieldably urging said pin away from said access opening, and cam and follower means coupled to said pin to cooperate with said spring in holding said slide releasably in place when said supporting elements are contracted, and urging said slide away from said shaft when said supporting elements are expanded.

25. A slide projector as defined in claim 24 in which said cam and follower means comprise a follower on said pin, and a track along which said follower moves during expansion and contraction of said supporting means, said track having a first surface generally perpendicular to said pin engaging said follower when in said contracted condition, and a surface inclined away from said access opening and said shaft engaging said follower in said expanded condition, thereby to cam said slide away from said shaft by the action of said spring.

26. A slide projector as defined in claim 25 in which said track extends along the path of said pin and has a plurality of longitudinally spaced first surfaces, and in which a plurality of branches are spaced along said main portion at preselected intervals, each branch having an inclined second surface for expanding said supporting means within slide carriers of different sizes and capacities.

27. A slide projector as defined in claim 18 in which said positioning surfaces are on rails generally paralleling a reference line between said supporting elements on opposite sides of said line for sliding engagement with the edges of slides on said slide holder, and on hubs around the ends of said supporting elements remote from said access opening, in the same plane as said bars, for engaging the holder when it is fitted around the supporting elements.

28. A slide projector as defined in claim 18 in which one or said supporting elements is rotatable to feed said slide holder, and said drive means comprise a reciprocating motor, a driver reciprocated by said motor through forward and return strokes, a hub on said rotatable supporting element, and a ratchet coupling between said hub and said driver for indexing the hub during each forward stroke of the driver.

29. A slide projector as described in claim 28 in which said ratchet coupling comprises a series of abutments on said hub radially spaced from the axis of rotation, and at least one ratchet lug on said driver engageable with one of said abutments during each forward stroke to index the hub in one direction during each forward stroke and to yield in passing the next abutment of said series druing the following return stroke.

30. A slide projector as described in claim 29 in which said driver also has a second ratchet lug, and is movable between first and second positions to bring one lug into position to index said hub in one direction in said first position, and to bring said second lug into position to index said hub in the opposite direction in said second position, and further including means for moving said driver selectively back and forth between said first and second positions.

31. A slide projector as described in claim 28 further including a slide-positioning device disposed in said recess on the side of said projection station opposite said one positioning element, and movable toward the latter to grip the free edge of a slide in said station and draw the slide into the proper plane for projection, and means connecting said device to said reciprocating motor for actuation by the motor in timed relation with the indexing of said hub.

32. A slide projector as described in claim 31 in which said connecting means include a lost-motion connection coupling said device to said motor only during the final portion of each forward stroke of the driver and after a substandial initial portion of the forward stroke for initiating feeding of said carrier.

33. A slide projector as described in claim 32 in which said lost-motion connection includes a cushioning spring through which the force for moving the device into engagement with a slide is applied.

34. A slide projector for use with an unsupported flexible slide holder comprising an endless belt with a series of clips thereon for gripping slides and supporting them in outwardly projecting side-by-side relation, said slide projector having, in combination, a case having an internal recess, an access opening on one side of said recess, and a cover door overlying said access opening and movable between open and closed positions;

an optical system in said case including a slide projection station located in said recess;

supporting means in said recess for receiving a slide holder edgewise through said access opening and directly into position for projection of slides thereon from said projection station when said cover door is in the open position, said supporting means including two elongated supporting elements mounted in said recess for relative movement toward each other to a contracted condition to receive the slide holder loosely around them, and away from each other to an expanded condition to tighten the slide holder around them, one of said elements being disposed alongside said projection station, and means for locating the slide holder on said supporting elements at the proper level for projection of slides thereon from said projection station;

and selectively operable drive means for feeding the slide holder step by step through selected increments to feed slides one by one to said projection station.

35. A slide projector as defined in claim 34 in which one of said supporting elements is supported at one end for rotation about a fixed axis, and the other is mounted on a slide for movement toward and away from said one element, and further including means for shifting said slide selectively back and forth between the expanded and contracted position, holding the slide releasably in the contracted condition to receive the holder, and urging the slide away from said one element with a preselected approximate spring force in said expanded condition.

36. A slide projector as defined in claim 35 in which the last-mentioned means is operable in a plurality of different zones, spaced different distances from said one element, to accommodate slide holders of different sizes and capacities.

37. A slide projector as defined in claim 35 in which the last-mentioned means comprise a main track paralleling the path of said slide, a plurality of branch tracks intersecting said main track and inclined away from the latter and from said one element, a pin supporting said other element and movable axially relative thereto and to said slide, a follower on said pin riding along said track, and a spring acting between said slide and said follower to urge the latter along the inclined branch tracks and thereby to tension slide holders different sizes when said follower is in different branch tracks.

38. A slide projector as defined in claim 37 in which said other element is a roller rotatably supported on said pin, and in which a gripping knob is mounted on a free end of said pin for moving it axially relative to said slide and said roller.

39. A slide projector as defined in claim 35 in which said drive means include a reciprocating driver movable back and forth through forward and return strokes past said one end of said fixed shaft, a ratchet coupling between said fixed shaft and said driver for turning said shaft one step during each forward stroke, and a reciprocating motor operable when actuated to reciprocate said driver.

40. A slide projector as defined in claim 39 further including a positioning fork supported in said recess on one side of said projection station for movement into and out of engagement with each slide in said station, and connected to said driver to be drawn into engagement during the final portion of the forward stroke of said driver.

41. A slide projector as defined in claim 40 further including a hold-out apparatus including two arms supported on a rocker for movement into engagement with the two slides on opposite sides of a slide in said projection station, said rocker being connected to said positioning fork to move said arms into engagement with said two slides as said fork is moved into engagement with the slide in said projection station.

42. A slide projector as defined in claim 41 further including a shutter mounted on said rocker to move into a blocking position across said optical system when said arms and said fork are disengaged, and to move out of said blocking position as said fork and said arms are engaged.

43. A slide projector as defined in claim 42 in which said reciprocating motor is a solenoid that is energized to produce each forward stroke, and in which said driver is coupled to said fork, said hold-out apparatus and said shutter through a lost-motion connection permitting the driver to feed the slide holder far enough to bring a slide close to said projection station before moving said fork, said rocker and said shutter.

* * * * *

UNITED STATES PATENT OFFICE
CERTIFICATE OF CORRECTION

Patent No. 3,729,254          Dated April 24, 1973

Inventor(s) Gerald J. Frey and Gary E. Peterson

It is certified that error appears in the above-identified patent and that said Letters Patent are hereby corrected as shown below:

Page 1, ABSTRACT, 8th line from bottom - "slips" should be --clips--

Column 4, line 48, insert --45-- after "elements"

Column 5, line 42, after "that" insert --is--

Column 8, line 2, after "95" insert --to--

Column 9, line 48, change "hold" to --held--

Column 12, line 33, change ",f" to --of--

Column 15, line 9, change "notch in" to --notches--

Column 15, line 47, change "slider" to --slide--

Column 16, line 39, change "deenergized" to --energized--

Column 22, line 2, change "or" to --of--.

Signed and sealed this 19th day of March 1974.

(SEAL)
Attest:

EDWARD M. FLETCHER, JR.
Attesting Officer

C. MARSHALL DANN
Commissioner of Patents